(12) United States Patent
Zhang et al.

(10) Patent No.: US 12,001,421 B2
(45) Date of Patent: Jun. 4, 2024

(54) ISSUE TRACKING SYSTEMS AND METHODS FOR A CONFIGURABLE PROJECT HIERARCHY

(71) Applicants: Atlassian Pty Ltd., Sydney (AU); Atlassian Inc., San Francisco, CA (US)

(72) Inventors: Ed Zhang, Sydney (AU); Nhat Tran, Sydney (AU); Albert Kavelar, Sydney (AU); Bree Davies, Sydney (AU); Andre van der Schyff, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 143 days.

(21) Appl. No.: 17/563,826

(22) Filed: Dec. 28, 2021

(65) Prior Publication Data

US 2022/0121653 A1 Apr. 21, 2022

Related U.S. Application Data

(63) Continuation of application No. 16/833,299, filed on Mar. 27, 2020, now Pat. No. 11,238,030.

(60) Provisional application No. 62/825,969, filed on Mar. 29, 2019.

(51) Int. Cl.
*G06F 7/00* (2006.01)
*G06F 16/22* (2019.01)
*G06F 16/23* (2019.01)

(52) U.S. Cl.
CPC ...... *G06F 16/2379* (2019.01); *G06F 16/2291* (2019.01)

(58) Field of Classification Search
CPC .................. G06F 16/2379; G06F 16/2291
USPC ................................... 707/600–899
See application file for complete search history.

(56) References Cited

U.S. PATENT DOCUMENTS 8,655,857 B1 * 2/2014 Oscherov .............. G06F 9/4488
717/165

OTHER PUBLICATIONS

Doubly Linked List Program in C date unknown [captured on Dec. 16, 2015 by archive.org], tutorialspoint.com, https://web.archive.org/web/20151216015720/https://www.tutorialspoint.com/data_structures_algorithms/doubly_l inked_list_program_in_c. htm.
Rdlopes, Doubly Linked List, Insert Before A Given Node in Java Oct. 9, 2018, StackOverflow, https://stackoverflow.com/questions/52723066/doubly-linked-list-insert-before-a-given-node-in-java/52723754 + code in scrollable embedded frame.
Firebox Training, OBIEE 11g Dimension Hierarchies—OBIEE Online Training Jul. 4, 2014, Youtube, https://www.youtube.com/watch?v =DomKnrsITQQ.

(Continued)

*Primary Examiner* — Isaac M Woo
(74) *Attorney, Agent, or Firm* — Brownstein Hyatt Farber Schreck, LLP

(57) ABSTRACT

Described herein is a computer implemented method for maintaining a configurable project hierarchy. The method comprises creating a new hierarchy level data record and storing the new hierarchy level data record in a data store. The method further comprises receiving a request to associate a particular issue type with the new hierarchy level and, in response, creating a new hierarchy/issue type association data record including an identifier of the particular issue type and an identifier of the new hierarchy level identifier.

7 Claims, 5 Drawing Sheets

(56) References Cited

OTHER PUBLICATIONS

Lane, Oracle Data Warehousing Guide Jul. 2013, Oracle, 11 g Release 2, https://docs.oracle.com/cd/E11882_01/server.112/e25554/ title .htm, https://docs.oracle .com/cd/E 11882_ 01 /server. 112/e25554/hardware. htm#DWH SG8124; https ://docs .oracle .com/cd/E 11882_01 /server.112/e25554/di men. htm#DWH SG8259.

Kashinathan, What is a Factless Fact Table?Where we use Factless Fact Aug. 4, 2012, blogspot.com, http://u dwhlaureate .blogspot.com/2012/08/factless-fact-table .html.

Lorentz, SOL Language Reference Jan. 2016, Oracle, 11 g Release 2, https://docs.oracle.com/cd/E 11882_01/server.112/e41084/V title. htm, https://docs.oracle.com/cd/E 11882_01/server. 112/e41084/statements_1006.htm#SQLRF00803.

* cited by examiner

180
ISSUE TRACKING SYSTEMS AND METHODS FOR A CONFIGURABLE PROJECT HIERARCHY

CROSS-REFERENCE TO RELATED APPLICATION(S)

This application is a continuation patent application of U.S. patent application Ser. No. 16/833,299, filed Mar. 27, 2020 and titled "Improved Issue Tracking Systems and Methods for a Configurable Project Hierarchy," which is a nonprovisional patent application of and claims the benefit of U.S. Provisional Patent Application No. 62/825,969, filed Mar. 29, 2019 and titled "Improved Issue Tracking Systems and Methods for a Configurable Project Hierarchy," the disclosures of which are hereby incorporated herein by reference in their entireties.

FIELD

The present disclosure is directed to issue tracking systems and methods.

BACKGROUND

Issue tracking systems are systems that manage the creation and tracking of issues in a variety of contexts. Issue tracking systems are variously referred to a trouble ticket systems, support ticket systems, request management systems, and incident ticket systems.

Some issue tracking systems allow for different types of issues to be created and tracked. For example, an issue tracking system may allow users to create their own types of issues (with associated data and workflows) and use those issue types for managing a given project (e.g. a helpdesk, a software development project, an alternative project). While allowing users to create and use different issue types provides flexibility, it can also make managing issues (and types of issues), and the relationships between them, difficult.

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Figure 1:
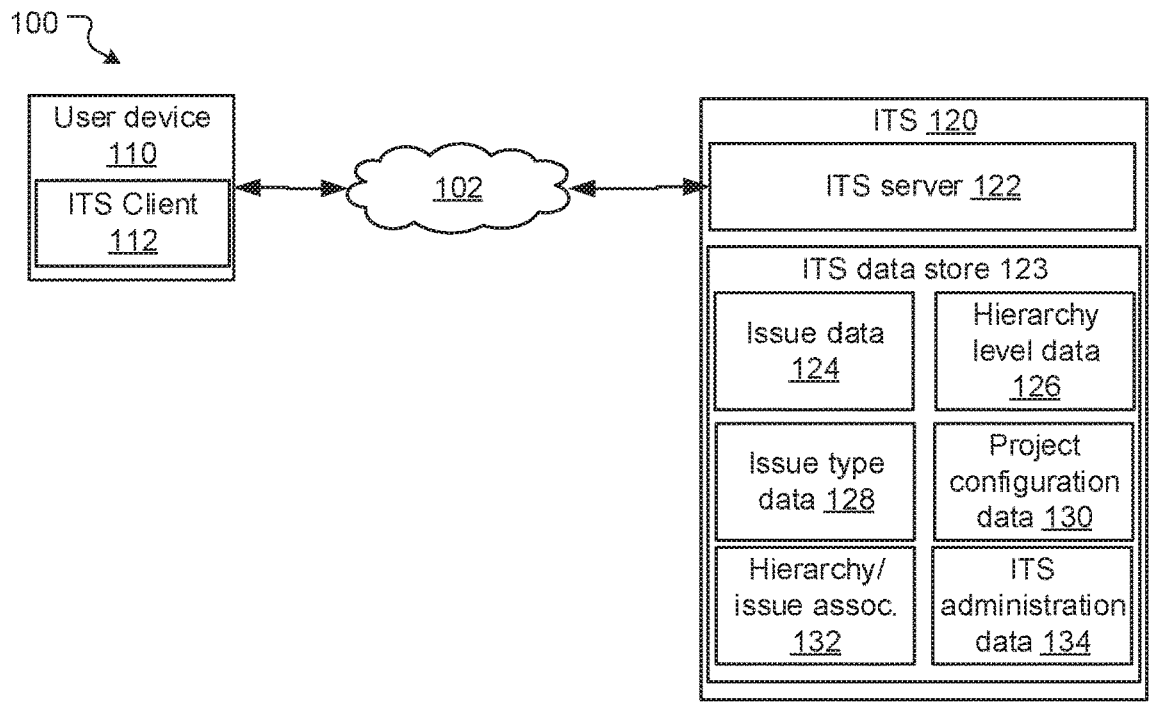
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

In this disclosure, there are two related but different concepts: issue type and hierarchy level.

The term 'issue type' refers to a type or category of an issue. An actual issue created by user will be of a particular issue type. The issue type defines, for example, the data that is (or can be) associated with that issue and the workflow of that issue (for example, the states the issue can be in and the state transitions the issue can go through).

The term 'hierarchy level' refers to a particular level of a hierarchy. Each level of the hierarchy can be associated with one or more issue types. A hierarchy is an ordering of levels, where each level can be associated with an above level (e.g. a parent level) and/or a below level (e.g. a child level). At least one hierarchy level (the topmost level) will have no level above it and at least one hierarchy level (the bottommost level) will have no level below it. A hierarchy level can be associated with a number which indicates a ranking of the level within the hierarchy. For example, a base level can be associated with the number '0', a level above the base level with '1', and a level below the base level is '−1'. A level below the '−1' level is '−2' and so on. A level above the '1' level is '2' and so on.

The present disclosure allows for a hierarchy of issue types to be defined, with each level of the hierarchy associated with one or more issue types. In the embodiments described herein, both the hierarchy levels and the association of issue types with those hierarchy levels are configured and specific to a particular project. This means that a hierarchy may be defined specifically for a project and therefore the hierarchy of levels (and/or the issue types associated to those levels) may change from project to project.

In alternative embodiments, hierarchy levels may be commonly defined (either for all projects or on a project-type basis), however the association of issue types with the different hierarchy levels can be user-defined.

In still further alternative embodiments, both hierarchy levels and their associated issue types may be pre-defined (either for all projects or on a project-type basis).

The embodiments described herein relate to the creation, deletion and querying of issue type hierarchies in issue tracking systems. This allows users to have the flexibility of structuring their work by introducing an arbitrary number of hierarchy levels. By way of example, in a software development context example of issue types may include stories, bugs and tasks, and examples of hierarchy levels include epic, base and sub-task.

Initially, an example environment in which aspects of the present disclosure can be implemented is described. A description of an example computer system which is configurable to perform the various operations described herein is then provided. Following this, issue tracking system operations are described.

Environment Overview

FIG. 1 illustrates an example environment 100 in which embodiments and features of the present disclosure can be implemented. Example environment 100 includes a communications network 102 which interconnects user devices (e.g. user device 110) and an issue tracking system (ITS) 120.

User device 110 is a computer processing system with an ITS client application 112 installed thereon. User device 110 will also have other applications installed/running thereon, for example at least an operating system.

When executed by the user device 110 (e.g. by a processor such as processor 204 described below), the ITS client application 112 configures the user device 110 to provide client-side ITS functionality. This generally involves communicating (using a communication interface such as 218 described below) with the ITS 120 (and, in particular, the ITS server application 122) and performing other operations as described herein. ITS client application 112 may be a dedicated application client that communicates with an ITS application server using an API. Alternatively, ITS client application 112 may be a web browser (such as Chrome, Safari, Internet Explorer, Firefox, or an alternative web browser) which communicates with an ITS web server using http/https protocols.

User device 110 may be any form of computing device. Typically, user device 110 will be a personal computing device—e.g. a desktop computer, laptop computer, tablet computer, and in some instance even a mobile phone. While a single user device 110 has been illustrated, an environment would typically include multiple user devices 110 interacting with the ITS 120.

As discussed further below the ITS client application 112 may configure the user device 110 to provide issue type and workflow creation functionality (i.e. creating new issue types and workflows (states that an issue of the issue type may take and the transitions between those states)) and/or workflow use functionality (that is, using existing ITS workflows). Workflows may be created and used by different users (using different user devices), though in many cases the same user may both create and use workflows using the same user device 110.

ITS 120 in this example includes an ITS server application 122, and an ITS issue data store 123.

The ITS server application 122 comprises one or more application programs, libraries, APIs or other software elements which, when executed, configure the ITS 120 to provide server side ITS functionality—e.g. by receiving and responding to requests from ITS client applications (e.g. client application 112), storing/retrieving data from the ITS and data store 123, and performing other operations as described herein.

ITS server application 122 may be a web server (such as Apache, IIS, nginx, GWS, or an alternative web server for interacting with web browser clients) or an application server (i.e. specifically programmed to interact with dedicated application clients using a defined set of application programming interface (API) calls). While ITS 120 has been illustrated with a single server application 122 it may provide multiple servers (e.g. one or more web servers and/or one or more application servers) operating on one or more computing devices/systems.

ITS data store 123 is used to store data involved in the typical operation of the ITS 120. In the present example, the ITS data store stores issue data 124, hierarchy data 126, issue type data 128; project configuration data 130; hierarchy/issue association data 132, and ITS administration data 134.

The issue data 124 may include, for example, data in respect of actual (i.e. instantiated) issues that have been created and are being managed by the ITS, and the ITS administration data 134 may include various data involved in the operation of the ITS (for example, user account details, permissions, and the like). The other types of data will be described further below.

While a single ITS data store 123 is described, multiple separate data stores could be provided.

In certain embodiments, ITS 120 is a scalable system including multiple distributed server nodes connected to one or more shared data stores (e.g. shared file servers). Depending on demand from clients (and/or other performance requirements), ITS 120 server nodes can be provisioned/de-provisioned on demand to increase/decrease the number of servers offered by the ITS 120. Each ITS server 122 may run on a separate computer system and include one or more application programs, libraries, APIs or other software that implement server-side functionality. Similarly, the data store 123 may run on the same computer system as an ITS server application 122, or may run on their own dedicated system(s) (accessible to ITS server application(s) 122 either directly or via a communications network).

Communications between the various systems in environment 100 are via the communications network 102. Communications network may be a local area network, public network (e.g. the Internet), or a combination of both.

While environment 100 has been provided as an example, alternative system environments/architectures are possible.

Hardware Overview

The embodiments and features described herein are implemented by one or more special-purpose computing systems or devices. For example, in environment 100 each of the user device 110 and ITS 120 is or includes a type of computing system.

A special-purpose computing system may be hard-wired to perform the relevant operations described herein. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
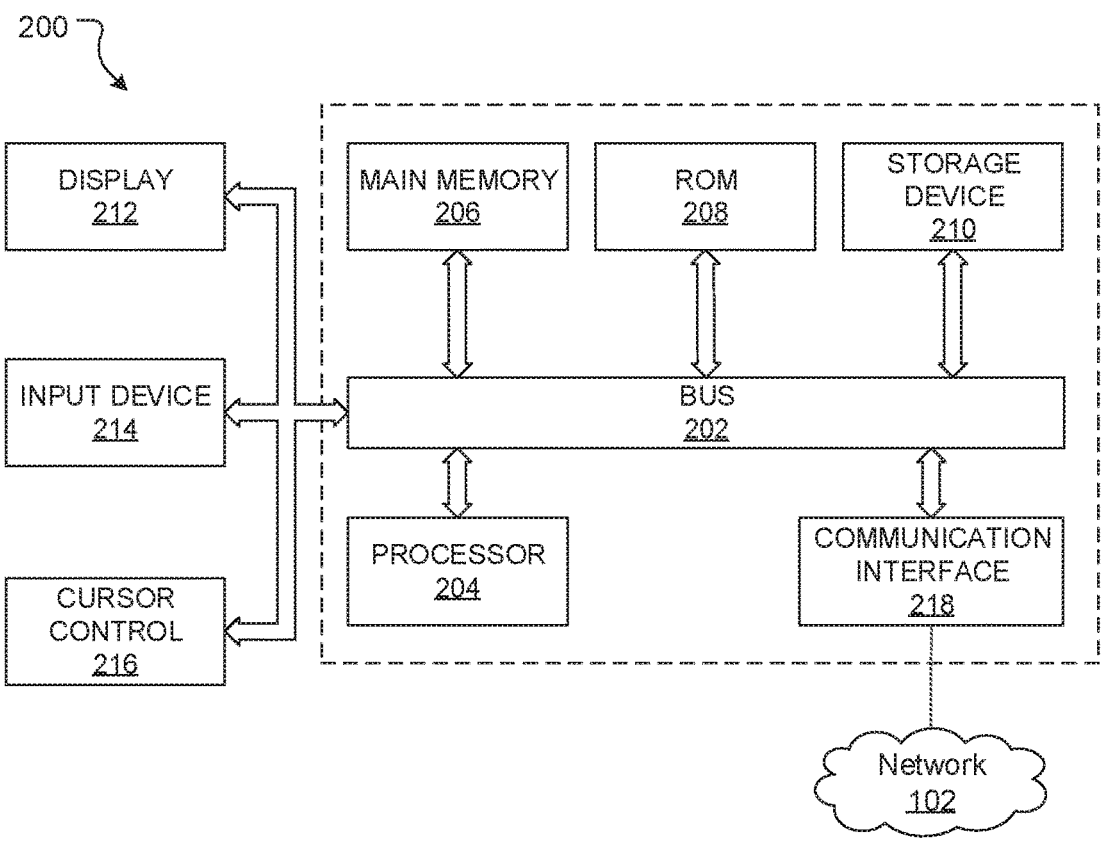
FIG. 2 is a block diagram of a computing system configurable to perform various features and embodiments of the present disclosure.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the operations described herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 102, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer (e.g. such as ITS 120), it will typically be provided with higher end hardware allowing it to process data, access memory, and perform network communications more rapidly than, for example, a user device (such as user device 110).

Issue Tracking Systems

The ITS server application 122 (running on ITS 120) and ITS client application 112 (running on user device 110) operate together to provide an ITS and ITS functionality.

Many operations described herein as ITS operations or operations being performed by the ITS may be performed by the ITS client application 112 (operating on user device 110), the ITS server application 122 (operating on IT server system 120), or the ITS client application 112 and ITS server application 122 in cooperation. For example, ITS operations involving the display of information involve displaying information on the user device 110 (e.g. on a display such as 212) as controlled by the ITS client application 112. The data displayed, however, may be generated by the ITS client application 112 itself, or generated by the ITS server application 122 and communicated to the ITS client application 112 therefrom. As a further example, ITS operations involving user input involve the user device 110 receiving user input (e.g. at input device 214) and passing that input to the ITS client application 112. The information input may be processed by the ITS client application 112 itself, or communicated by the ITS client application 112 to the ITS server application 122 to be processed by the ITS server application 122. ITS operations involving writing data to the data stores 124, 126, 128 and 130 involve the ITS server application 122. The data written to a data store may, however, be communicated to the ITS server application 122 by the ITS client application 112.

One example of an ITS with which the present disclosure may be implemented is Jira, which is commercially available from Atlassian Pty Ltd., Sydney, Australia. For the purposes of explanation the present disclosure will predominantly refer to Jira, however the features described herein could be applied to alternative ITS's.

Generally speaking, an ITS provides users with the ability to create and track issues—or, more generally, work items. A work item is an item with associated information and an associated lifecycle—i.e. a series of states through which the work item transitions over its lifecycle. The lifecycle for a given work item may be simple (e.g. an open state and a closed state) or more complex (e.g. open, closed, resolved, in progress, reopened).

The particular information and lifecycle associated with a work item may vary greatly depending on the scenario in which the ITS is implemented. By way of example, an ITS may be implemented in a helpdesk scenario, in which case the work items may be issues or tickets logged with the helpdesk. An ITS may be implemented in a project management scenario, in which case the work items may be project tasks. An ITS may be implemented in a software development scenario, in which case work items may be bugs, current features under development, and/or features intended for further development. An ITS may be implemented in an organizational administration scenario, in which case work items may be administrative forms (e.g. leave request forms or the like). Many other ITS implementations in which different work items are tracked through different lifecycles are possible. For ease of reference, the following disclosure will refer to issues, however the features and operations described could apply to any other type of work item maintained by an ITS.

In order to facilitate the creation and tracking of issues, ITS 120 maintains ITS metadata (e.g. in issue data store 124) defining the operation of the ITS 100. Such metadata may include, for example: one or more lifecycle definitions, a lifecycle definition defining the lifecycle of an issue of a particular issue type (e.g. the states an issue can take and the manner in which an issue transitions between those states over its lifecycle); and user permissions (e.g. which users may create issues, view issues, amend issues, change the states of issues etc.).

ITS 120 may be configured to store a wide variety of information in respect of a given issue. By way of one simple example, an issue type definition may define the following fields: a project field storing a project to which the issue belongs; a key field storing a unique identifier for an issue; a description field storing a description of the issue and actions taken with respect to the issue; a status field indicating the stage the issue is currently at in its lifecycle; an assigned person field indicating who (if anyone) the issue has been assigned to; a severity field storing the severity of the issue (e.g. critical, major, minor, etc.); a priority field storing the priority of the issue at a general level (e.g. very high, high, medium, low, very low); and a rank field storing a rank value in respect of the issue (defining a rank order of the issue relative to other issues). Issue ranking is described in greater detail below. The actual fields defined with respect to an issue type will depend on the requirements of a given ITS implementation, and many other fields are possible.

The lifecycle associated with a given issue will also depend on the specific requirements of the ITS implementation. By way of a simple example, a lifecycle for use in a simple helpdesk implementation could involve the following states (and appropriate allowed transitions therebetween): an open state; an in progress state; a resolved state; a closed state; and a reopened state. Different lifecycles with different states and/or transitions between states will be appropriate for different implementations.

In order to create and progress issues in ITS 120, users interact with appropriate user interfaces provided by an ITS client application 112. For example, a user may create a new issue and provide relevant information in respect of the issue (e.g. a particular project the issue is associated with, a description, a priority, any other relevant information catered for). The ITS 120 itself will typically generate a key that can be used to uniquely identify the issue, which may be hidden from or visible to the user. Once an issue has been created a user can interact with it, for example by adding additional information to the issue (e.g. in an issue description or other field), changing the state of the issue (e.g. from in progress to resolved), assigning the issue to another person (e.g. by changing an assigned person field).

Project Hierarchy

In the present embodiments, a hierarchy is defined for a project. This means that an instance of a hierarchy will be independently defined for each project even though a given project may have some (or all) hierarchy levels in common with another project.

A given hierarchy level may have a parent hierarchy level (i.e. an immediately superior hierarchy level, e.g. current level +1) and/or a child hierarchy level (i.e. an immediately inferior hierarchy level, e.g. current level −1).

Once hierarchy levels for a project have been established, issue types are associated with those hierarchy levels.

In this disclosure, therefore, parent/child (e.g. hierarchy) relationships are defined at the issue type level. For example, if issue type A is associated with hierarchy level +1, any issue of type A that is created inherits this hierarchy. If issue type B is associated with hierarchy level 0, an issue that is of type A (level +1) cannot be a child of any issue that is of type B (level 0) as this would violate the established hierarchy. Conversely, an issue that is of type B (level 0) can be a child of an issue that is of type A (level +1) as this conforms to the established hierarchy.

As indicated above, a hierarchy level can be associated with a number which indicates a ranking of the hierarchy level. For example: a base level can be associated with the number '0'; a level above the base level with '1'; a level below the base level with '−1'; a level above the '+1' level with '+2'; a level below the '−1' level with '−2'; and so on.

In certain implementation, the ranking of hierarchy levels is per project as issue types and hierarchy levels can be defined by the user at a project level. That means that the issue types and hierarchy levels (and associations between) are not necessarily global but can be customized for an individual project. The issue types can be used to reflect either a degree of granularity of issues or a category of issues or both.

For example, an issue type such as 'epic' may typically be used for an issue at the level of a deployable feature released at the end of the timeline allocated for the epic. In other examples, an epic can be used as a general label for features, teams or activities that could happen at any time. These epics can be ongoing and do not necessarily need a clear end or timeline. In this case, an epic hierarchy level operates as a label showing what category an issue belonged to. Note that these example usages of issue types are described for illustrative purposes. There are many other issue types and usages of issue types that are contemplated by this disclosure.

Figure 3:
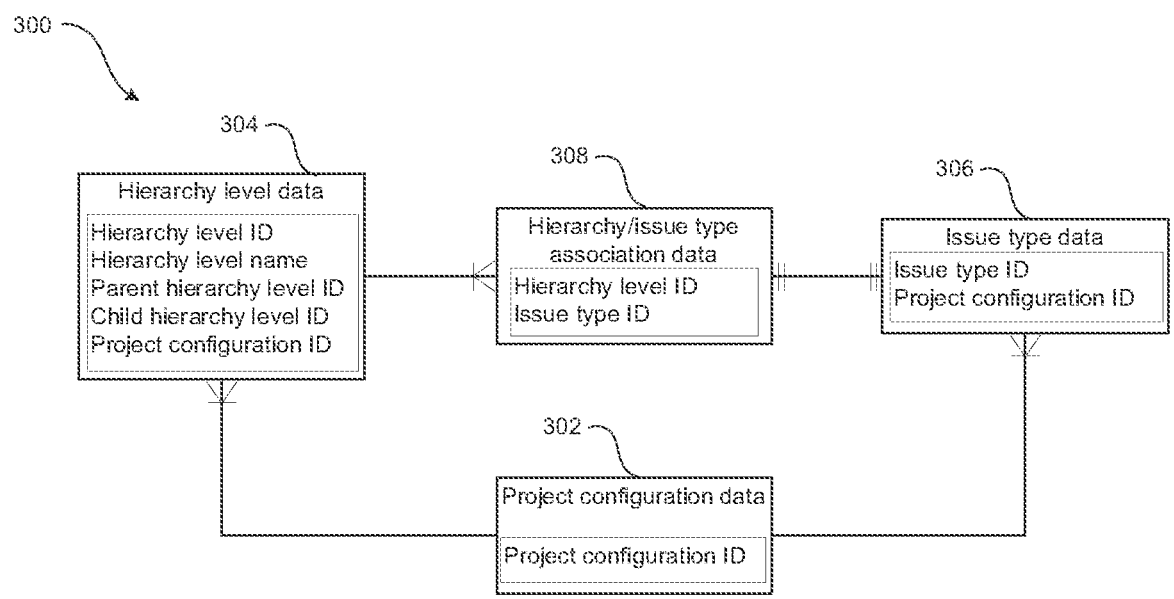
FIG. 3 is an example of data structures for storing issue type hierarchy data.

FIG. 3 is an illustrative example of how data in respect of issue type hierarchies may be stored. Specifically, FIG. 3 provides an example entity relationship diagram 300.

ER diagram 300 includes a project configuration data structure 302 (e.g. a database table) for creating records to store project configuration data 130. In the present example, the project configuration data structure 302 includes a project configuration identifier. Fields for storing additional data in respect of a particular project (or project configuration) could be provided, either in data structure 302 or in one or more additional data structures (linked with data structure 302 by use of a project configuration ID field).

ER diagram 300 includes a hierarchy level data structure 304 (e.g. a database table) for creating records to store hierarchy level data 126. In the present example, the hierarchy level data structure 304 includes: a hierarchy level identifier (to identify the hierarchy level); a hierarchy level name (e.g. a human readable name); a parent hierarchy level identifier (also a hierarchy level ID, used to identify a parent hierarchy level if one exists); and a project configuration identifier (used to identify a particular project configuration and thereby associate the hierarchy level with a particular project). Fields for storing additional hierarchy level data could be provided. For example, in certain embodiments the hierarchy level data structure 304 may include a field which indicates whether the hierarchy level is a 'base' level for the project defined by the project configuration identifier. Base levels are levels which may have particular rules that, for example, prevent their deletion. Further fields for storing additional data associated with a particular hierarchy level could be provided, either in data structure 304 or in one or more additional data structures (linked with data structure 304 by use of a hierarchy level ID field).

ER diagram 300 includes an issue type data structure 306 (e.g. a database table) for creating records to store issue type data 128. In the present example, the issue type data structure 306 includes: an issue type identifier (to identify the issue type); and a project configuration identifier (used to identify a particular project configuration and thereby associate the hierarchy level with a particular project). Fields for storing additional data associated with a given issue type could be provided, either in data structure 306 or in one or more additional data structures (linked to data structure 306 by use of an issue ID field). For example, ITS 120 will typically provide one or more additional tables/data structures for storing additional data associated with issue types—for example the fields available for use for a given issue type and the work flows (e.g. available states and state transitions) of a given issue type.

ER diagram 300 includes a hierarchy/issue type association data structure 308 (e.g. a database table) for creating records to store hierarchy/issue type association data 132. In the present example, the hierarchy/issue type association data structure 308 includes: a hierarchy level identifier and an issue type identifier. The hierarchy level identifier is used to identify a particular hierarchy level and thereby associate it with a particular issue type (as identified by the issue type identifier). Fields for storing additional data associated with a given hierarchy/issue type association could be provided (for example a date created field and/or other fields).

Using the various data above, a particular project configuration can be created and assigned a project configuration identifier. Using the project configuration identifier, the particular project can be associated with one or more issue type hierarchy levels (e.g. by creating a new hierarchy level data record for each issue type hierarchy level the particular project is to be associated with, each hierarchy level data record including the project configuration identifier for the particular project and a different hierarchy level identifier). Furthermore, using the project configuration identifier, the particular project can be associated with one or more issue types (e.g. by creating a new issue type data record for each issue type the project is to be associated with, each issue type data record including the project configuration identifier for the particular project and a different issue type identifier). Lastly, each issue type for the particular project can be associated with a particular hierarchy level (e.g. by creating a new hierarchy/issue type association record for each hierarchy/issue type association, each hierarchy/issue type association record including identifiers of an issue type and the hierarchy that issue type is to be associated with).

Alternative data structures (with additional and/or alternative fields) could be used to associate issue types with hierarchy levels (either on a per-project basis or more generally).

Hierarchy Level Addition

The hierarchy level data 126 includes data in relation to hierarchy levels. Hierarchy levels may be defined in various ways, however in the above example includes an identifier, a name for the hierarchy level, as well as an identifier for the hierarchy level above and an identifier with the hierarchy level below. If a hierarchy level is the highest hierarchy level, then the hierarchy level above may be empty or null. If a hierarchy level is the lowest hierarchy level, then the hierarchy level below will be empty or null.

Figure 4:
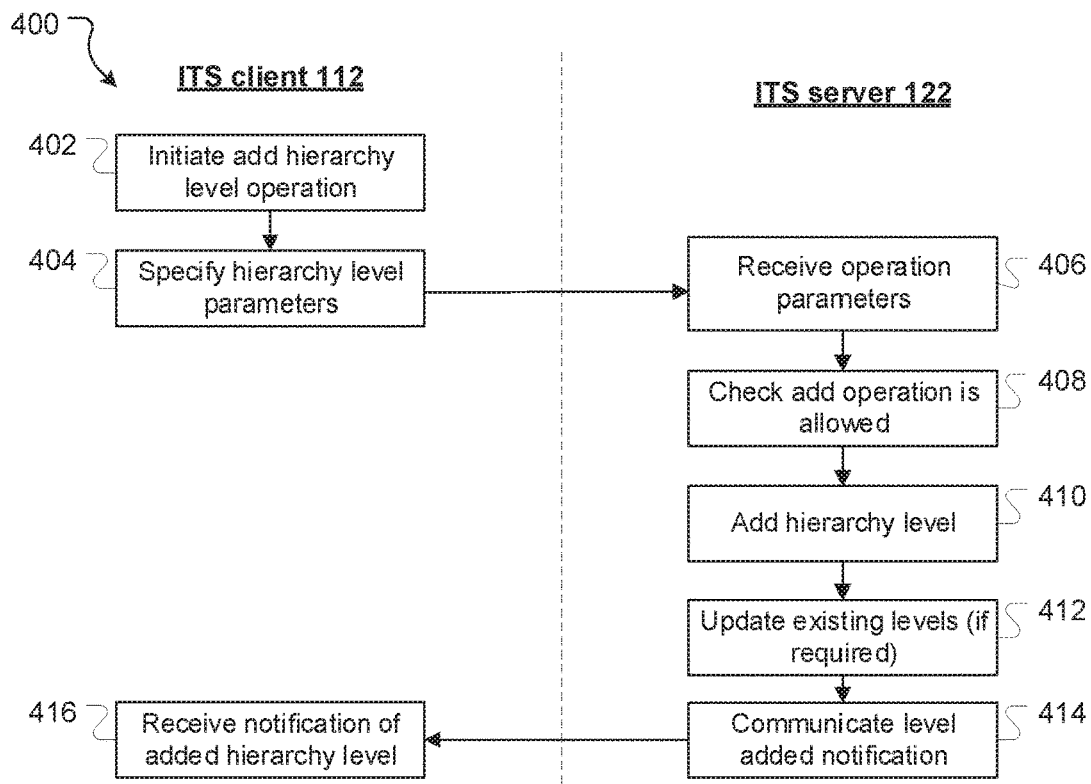
FIG. 4 is an example flowchart illustrating operations performed to add a hierarchy level to a project.

FIG. 4 illustrates an example method 400 for adding a hierarchy level to a project configuration.

At 402, a user interacts with user device 110 to initiate an add hierarchy level operation. This may be by any appropriate user interface(s) provided by ITS client application 112.

At 404, the user specifies relevant parameters for a new hierarchy level (again by use of one or more appropriate user interfaces). For example, a user may specify relevant parameters for the new hierarchy level: e.g. a name for the new level; a level at which the new hierarchy level is to be added; a description; a project to which the hierarchy level is to be added (where multiple projects are possible); and/or any other relevant information catered for. In order to specify a level at which the new level is to be added at, the user may request, for example, that the new hierarchy level be added: immediately above an existing level; immediately below an existing level; in between two existing levels. In this case, levels being identified by a hierarchy level identifier and/or hierarchy level name.

At 406, the ITS server 122 receives the add hierarchy level request and parameters from the ITS client 112.

At 408, the ITS server 122 determines whether the add hierarchy level operation is a valid operation. In some cases, adding a hierarchy level may be a restricted operation and may, for example, only be permissible if a level is being added between defined hierarchy levels (e.g. below the highest hierarchy level and/or above the lowest hierarchy level). That is, permissions may prevent adding a hierarchy level above the highest hierarchy level and/or below the lowest hierarchy level.

At 410, if the add operation is valid, the ITS server 122 adds the hierarchy level with the specified parameters. Referring to the ER diagram of FIG. 3 as discussed above, this involves creating a new hierarchy level record (per hierarchy level data structure 304) which includes details such as: an identifier of the level (the ITS server 122 itself may generate this identifier/key that can be used to uniquely identify the hierarchy level, and it may be hidden from or visible to the user); a name of the level (which may be defined by the user creating the level); a parent level identifier (if the new level has a parent level); a child level identifier (if the new level has a child level); and a project configuration identifier (which may be defined by the user or retrieved by the ITS server 122).

If the parameters specify that the new level is to be added above a particular level, the ITS server 122 sets the child level ID for the new hierarchy level record to the ID of the particular level. If the particular level the new level is being added above already had a parent level, the ITS server 122 sets the parent level ID for the new hierarchy level record to be the ID of the particular level's parent level. If the particular level the new level is being added above did not have a parent level, the ITS server 122 leaves the parent level ID for the new hierarchy level record blank (or sets it to a value indicating there is no parent level).

If the parameters specify that the new level is to be added below a particular level, the ITS server 122 sets the parent level ID for the new hierarchy level record to the ID of the particular level. If the particular level the new level is being added below already had a child level, the ITS server 122 sets the child level ID for the new hierarchy level record to be the ID of the particular level's child level. If the particular level the new level is being added below did not have a child level, the ITS server 122 leaves the child level ID for the new hierarchy level record blank (or sets it to a value indicating there is no child level).

If the parameters specify that the new level is to be added between two existing levels (an above level and a below level), the ITS server 122 sets the parent level ID for the new hierarchy level record to the level ID of the above level and the child level ID for the new hierarchy level record to the level ID of the below level.

At 412, and if required, the ITS server 122 accesses any relevant existing hierarchy level records in order to edit their parent/child hierarchy level identifiers to account for the newly added record.

If the new level is a parent to an existing level, the ITS server 122 edits the 'parent hierarchy level ID' of the existing level to refer to the level identifier of the new hierarchy level.

If the new level is a child to an existing level, the ITS server 122 edits the 'child hierarchy level ID' of the existing level to refer to the level identifier of the new hierarchy level.

At 414, the ITS server 122 generates and communicates a level added notification to the ITS client 112.

At 416, the ITS client receives the hierarchy level added notification. The user can then perform various operations regarding the hierarchy level, for example by renaming the hierarchy level, moving (i.e. changing the level of) the hierarchy level, deleting the hierarchy level, querying issue types or issues associated with the hierarchy level, associating issue types with the hierarchy level, deleting issue types associated with the hierarchy level, and/or other operations.

Associating an Issue Type with a Hierarchy Level

Figure 5:
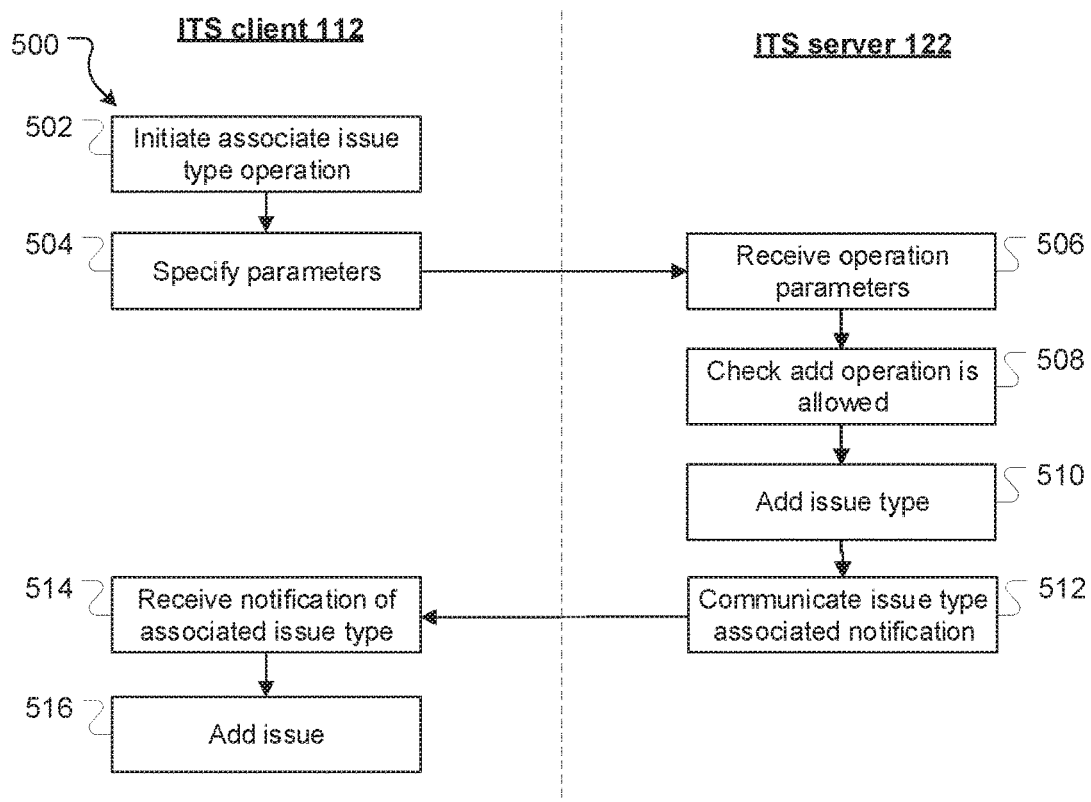
FIG. 5 is an example flowchart illustrating operations performed to associate an issue type with a hierarchy level.

FIG. 5 illustrates an example method 500 for associating an issue type with an existing hierarchy level. In the present example, this requires at least one hierarchy level to have been added to a project (e.g. per process 400 described above), in that at least one hierarchy level must exist otherwise there will be no hierarchy level to associate the issue type with. In practice, configuring the ITS so that projects are created with at least on default hierarchy level (e.g. a base level) may alleviate this problem.

At 502, a user interacts with appropriate user interfaces provided by the ITS client application 112 to initiate an associate issue type operation.

At 504, the user interacts with appropriate user interfaces provided by the ITS client application 112 to specify parameters for the operation—specifically, information in respect of the issue type that is to be associated with a hierarchy level (e.g. an issue type name and/or identifier) and information in respect of the particular hierarchy level (e.g. a hierarchy level name and/or identifier) will be required.

At 506, the ITS server 122 receives the associate issue type request and parameters from the ITS client 112.

At 508, the ITS server 122 determines whether the issue type association operation is a valid operation. In some cases, adding an issue type to a hierarchy level may be a restricted operation and may, for example, only be available if permissions associated with the user, the particular hierarchy level, and/or the particular issue type in question allow the operation to be performed.

At 510, if the issue type association operation is valid, the ITS server 122 associates the issue type with the hierarchy level. To do so, in the present example, the ITS server 122 creates a new hierarchy/issue type association record (e.g. per the hierarchy/issue type association data structure 308) that includes the hierarchy level and issue type identifiers in question.

At 512, the ITS server 122 generates and communicates an issue type associated notification to the ITS client 112.

At 514, the ITS client receives the issue type associated notification. The user can then perform various operations regarding the issue type/hierarchy level association that has been created. For example, once an issue type is associated with a hierarchy level a user may wish to change the particular hierarchy level the issue type is associated with—e.g. by moving it from a given level (e.g. base level 0) to a sub-task level (e.g. level −1). A user may also/alternatively want to delete the association.

Hierarchy Level Deletion

Figure 6:
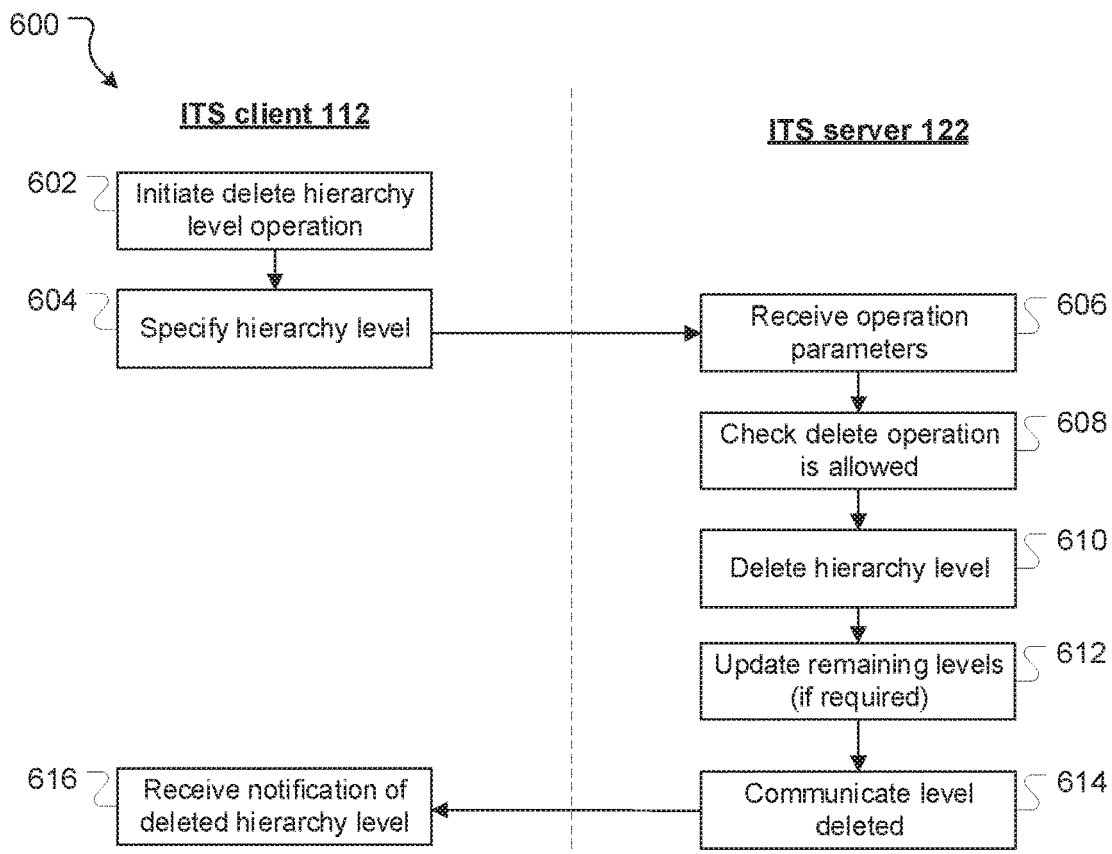
FIG. 6 is an example flowchart illustrating operations performed to delete a hierarchy level from a project.

FIG. 6 illustrates an example method 600 for deleting a hierarchy level.

At 602, a user interacts with one or more appropriate user interfaces provided by the ITS client application 112 to initiate a delete hierarchy level operation.

At 604, the user interacts with one or more appropriate user interfaces provided by the ITS client application 112 to specify the hierarchy level that the user wishes to delete.

At 606, the ITS server 122 receives the delete hierarchy level request and parameters from the ITS client 112.

At 608, the ITS server 122 determines whether the delete operation is a valid operation. In some cases deleting a hierarchy level is a restricted operation and may, for example, only be available for certain users, and/or for certain hierarchy levels (e.g. levels other than a base or default level, a highest hierarchy level, a lowest hierarchy level, and/or any other specifically defined level). That is, permissions may prevent deleting particular hierarchy levels.

In addition, or alternatively, the ITS server 122 may be configured to prevent a hierarchy level from being deleted if there are any issue types associated with that level. If there are one or more issue types associated with the level the user has requested to delete, the ITS server 122 may be configured to proceed in various ways.

For example, if there are one or more issue types associated with the level the user has requested to delete, the ITS server 122 may be configured to generate an error message, communicate this to the ITS client 112, and terminate the level deletion operation without deleting the level in question.

Alternatively, if there are one or more issue types associated with the level the user has requested to delete, the ITS server 122 may request (or the user may specify in advance) behaviour that will resolve what the ITS server 122 is to do with any issue types that are associated with the level that is to be deleted. For example, the user may indicate that any issue types currently associated with the level being deleted are to be moved to another hierarchy level—e.g. a parent hierarchy level of the level being deleted, a child hierarchy level of the level being deleted, or an alternative defined level.

Further alternatively, if there are one or more issue types associated with the level the user has requested to delete, the ITS server 122 may be configured to determine if the level being deleted has a parent level and, if so, associate all issue types currently associated with the level being deleted with the parent level. If the level being deleted does not have a parent level, the ITS 122 may then determine if the level being deleted has a child level and, if so, associate all issue types currently associated with the level being deleted with the child level. If the level being deleted does not have a parent or a child level, the ITS 122 may generate an error message, communicate this to the ITS client 112, and terminate the level deletion operation without deleting the level in question.

Further alternatively, if there are one or more issue types associated with the level the user has requested to delete, the ITS server 122 may be configured to disassociate those issue types with the hierarchy level being deleted (without re-associating them with any new hierarchy level).

At 610, if the delete level operation is determined to be valid, the ITS server 122 deletes the hierarchy level from the project.

To do so, the ITS either deletes the relevant hierarchy level record that associates the hierarchy level with the project, or otherwise records data to indicate that the record is historical and no longer valid.

At 612, and if required, the ITS server 122 accesses any relevant remaining hierarchy level records in order to edit their parent/child hierarchy level identifiers to account for the now deleted level.

If the deleted level had a parent level but no child level, at 612 the ITS server 122 accesses the hierarchy level record for the parent level and removes the deleted level's identifier from the child level ID field of that record. In this case, the child level ID field of the parent level's record is left blank (or provided with a value indicating there is no child level).

If the deleted level had a child level but no parent level, at 612 the ITS server 122 accesses the hierarchy level record for the child level and removes the deleted level's identifier from the parent level ID field of that record. In this case, the parent level ID field of the child level's record is left blank (or provided with a value indicating there is no parent level).

If the deleted level had both a parent level and a child level, at 612 the ITS server 122 accesses the hierarchy level records for both parent and child levels. For the parent level's record, the ITS server 122 amends the child level ID field to reference the ID of the child level. For the child level's record, the ITS server 122 amends the parent level ID field to reference the ID of the parent level.

At 614, the ITS server 122 generates and communicates a hierarchy level deleted notification to the ITS client 112. If any issue types were associated with the hierarchy level, the ITS server 122 may additionally communicate how these issue types have been handled (e.g. by association with an alternative hierarchy level removal of any hierarchy level association for those issue types).

At 616, the ITS client receives the hierarchy level deleted notification and can display or otherwise inform the user that the hierarchy level deletion was successful.

Deleting Hierarchy/Issue Type Association

Figure 7:
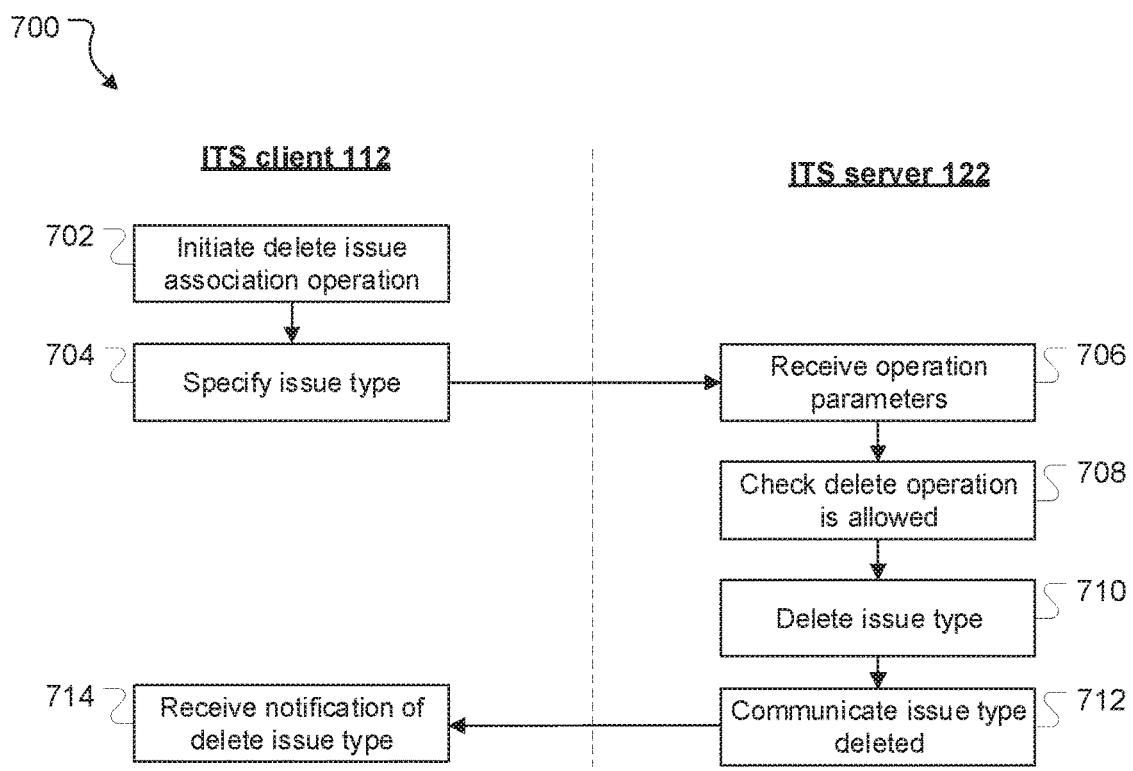
FIG. 7 is an example flowchart illustrating operations performed to disassociate an issue type with a hierarchy level.

FIG. 7 illustrates an example process 700 for deleting a hierarchy/issue type association.

At 702, a user interacts with appropriate user interfaces provided by ITS client application 112 to initiate a delete issue association type operation.

At 704, the user may interact with appropriate user interfaces provided by ITS client application 112 to specify the hierarchy/issue type association the user wishes to delete. This requires the user to identify both a specific issue type (e.g. by name and/or issue type identifier) and a specific hierarchy level (e.g. by name and/or hierarchy level identifier). Identifying only one of these will not suffice as a given hierarchy level may be associated with multiple issue types.

At 706, the ITS server 122 receives the delete hierarchy/issue type association request and parameters from the ITS client 112.

At 708, the ITS server 122 determines whether the delete operation is a valid operation. In some cases, deleting an issue type is a restricted operation and may, for example, only be performed by particular users and/or in respect of particular associations.

At 710, if the delete hierarchy/issue type association operation is determined to be valid, the ITS server 122 deletes the association between the hierarchy level and the issue type from the project.

To do so, the ITS either deletes the relevant hierarchy/issue type record that associates the hierarchy level with the issue type for the project, or otherwise records data to indicate that the record is historical and no longer valid.

At 712, the ITS server 122 generates and communicates a hierarchy/issue type association deleted notification to the ITS client 112.

At 714, the ITS client receives the hierarchy/issue type association deleted notification and can display or otherwise inform the user that the hierarchy/issue type association deletion was successful.

Issue Type Hierarchy Queries

Figure 8:
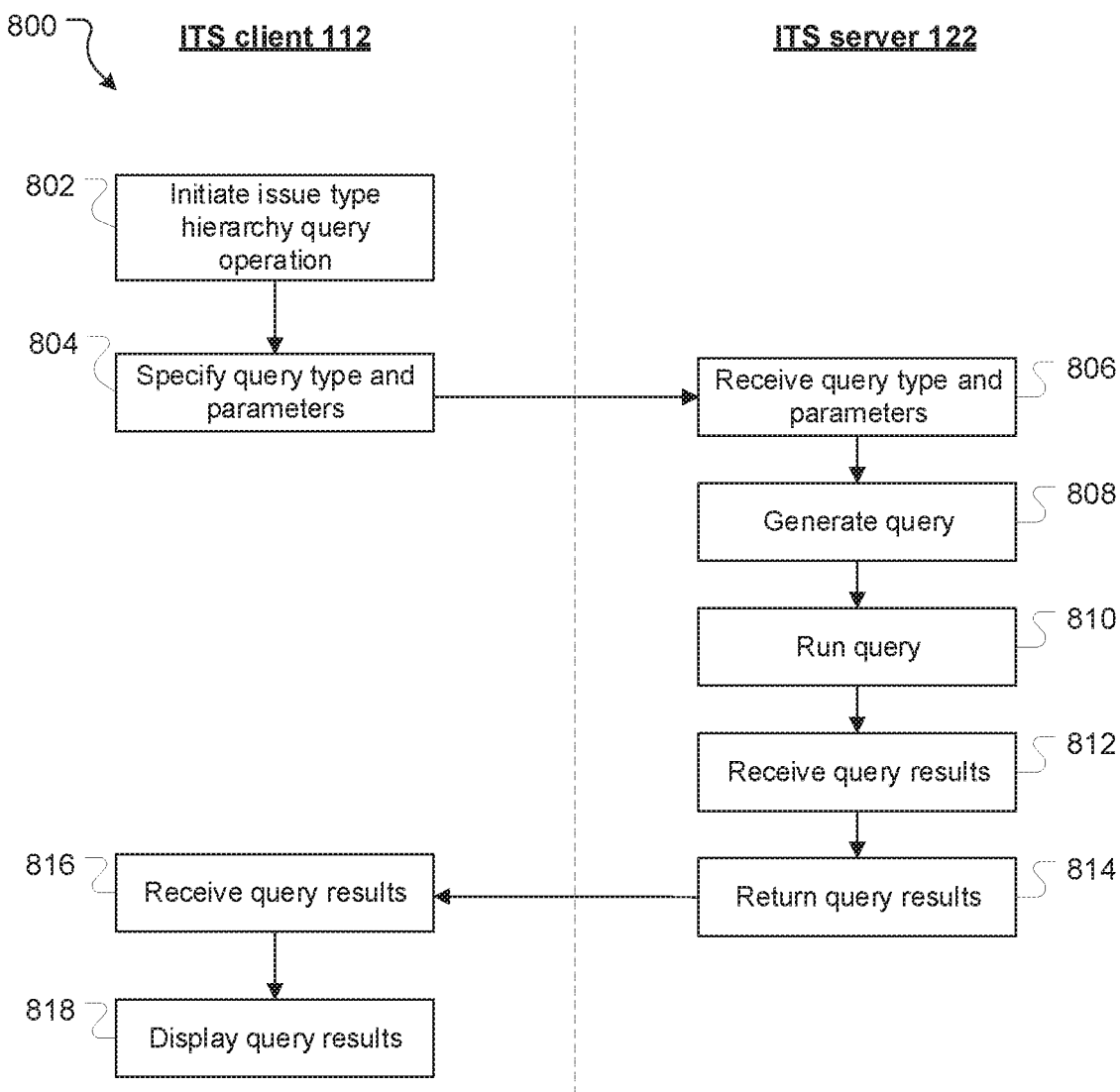
FIG. 8 is an example flowchart illustrating operations performed to query issue type hierarchy data.

FIG. 8 illustrates an example method 800 for querying ITS server 122 using the issue type hierarchy data described above.

At 802, a user interacts with appropriate user interfaces provided by an ITS client application 112 to initiate an issue type hierarchy query operation.

At 804, the user interacts with appropriate user interfaces provided by the ITS client application 112 to define a query type and one or more parameters required to run the query. Example query types and their parameters are described below.

At 806, the ITS server 122 receives the query type and parameters.

At 808, the ITS server 122 generates a query based on the received query type and parameters. Example queries are discussed below.

At 810, the ITS server 122 runs the query generated at 810—e.g. on ITS data store 123.

At 812, the ITS server 122 receives query results from the ITS data store 123. Provided the query is successful, the query results will include the data requested by the user (examples described further below).

At 814, the ITS server 122 returns the query results to the ITS client application 112.

At 816, the ITS client application 112 receives the query results.

At 818, the ITS client application 112 causes the query results to be displayed or otherwise presented.

Example queries that can be performed based on the issue type hierarchy data are discussed below.

One type of query made available may be a project hierarchy levels query, used to determine the hierarchy levels associated with a particular project. In this case, the parameters provided at 804 and received at 806 include a project identifier. To generate/run this query, the ITS server 122 requests the ITS data store 123 to return identifiers (and other information) of all hierarchy levels that are associated with the project identifier. This can be done by querying the hierarchy level data 126.

Another type of query made available may be a hierarchy level parent query, used to determine the parent of a given hierarchy level (if one exists). In this case, the parameters provided at 804 and received at include a hierarchy level identifier (and, if required, a project identifier). To generate/run this query, the ITS server 122 makes one or more requests to the ITS data store 123 to: determine an identifier for the hierarchy level if not known/provided as a parameter; determine the parent hierarchy level ID (if any) associated with the given hierarchy level; and obtain hierarchy level information in respect of that hierarchy level. This can be done by querying the hierarchy level data 126.

Another type of query made available may be a hierarchy level child query, used to determine the child of a given hierarchy level (if one exists). In this case, the parameters provided at 804 and received at include a hierarchy level identifier (and, if required, a project identifier). To generate/run this query, the ITS server 122 makes one or more requests to the ITS data store 123 to: determine an identifier for the hierarchy level if not known/provided as a parameter; determine the child hierarchy level ID (if any) associated with the given hierarchy level; and obtain hierarchy level information in respect of that hierarchy level. This can be done by querying the hierarchy level data 126.

Another type of query made available may be a hierarchy level issue type(s) query, used to determine any issue types associated with a given hierarchy level. In this case, the parameters provided at 804 and received at include a hierarchy level identifier (and, if required, a project identifier). To generate/run this query, the ITS server 122 makes one or more requests to the ITS data store 123 to: determine an identifier for the hierarchy level if not known/provided as a parameter (by querying the hierarchy level data 126); determine identifiers of any issue types associated with the hierarchy level (by querying the hierarchy/issue type association data 132); and obtain issue type information for those issue types (by querying the issue type data 128).

Another type of query made available may be an issue type hierarchy level query, used to determine the particular hierarchy level a given issue type is associated with. In this case, the parameters provided at 804 and received at include an issue type identifier (and, if required, a project identifier). To generate/run this query, the ITS server 122 makes one or more requests to the ITS data store 123 to: determine an identifier for the issue type if not known/provided as a parameter (by querying the issue type data 128); determine an identifier of any hierarchy level associated with the issue type (by querying the hierarchy/issue type association data 132); and obtain hierarchy level information for any hierarchy level (by querying the hierarchy level data 126).

Another type of query made available may be a hierarchy level issues query, used to determine issues (i.e. actual instantiated issues rather than issue types) that are associated with a given hierarchy level. In this case, the parameters provided at 804 and received at include a hierarchy level identifier (and, if required, a project identifier). To generate/run this query, the ITS server 122 makes one or more requests to the ITS data store 123 to: determine an identifier for the hierarchy level if not known/provided as a parameter (by querying the hierarchy level data 126); determine identifiers of any issue types associated with the hierarchy level (by querying the hierarchy/issue type association data 132); determining any actual issues of the determined issue types (by querying issue data 124).

Another type of query made available may be an issue hierarchy level query, used to determine a particular hierarchy level a specific issue (i.e. an actual instantiated issue rather than an issue type) is associated with. In this case, the parameters provided at 804 and received at include an issue identifier. To generate/run this query, the ITS server 122 makes one or more requests to the ITS data store 123 to: determine an identifier for the issue in question if not known/provided as a parameter (by querying the issue data 124); determine an issue type of that issue (by querying the issue data 124) (by querying the issue data 124); determine a hierarchy level the issue type is associated with (if any) (by querying the hierarchy/issue type association data 132); and obtaining hierarchy level information for that hierarchy level (by querying hierarchy level data 126).

Additional and/or alternative queries that make use of the issue type hierarchy data described above can be provided.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for managing a configurable project hierarchy using an issue tracking system, the method comprising:
   receiving a first request to add a new hierarchy level for a project managed by the issue tracking system, the project managed by the issue tracking system having a plurality of issue items, each issue item of the plurality of issue items having a set of fields including an issue type field, issue items in a respective common hierarchical level having a common issue type value in a respective issue type field, the first request received from a client device operating a client instance of the issue tracking system;

in response to receiving the first request to add the new hierarchy level, identifying an existing project hierarchy for the project in a data store of the issue tracking system;

generating a modified project hierarchy by adding a new hierarchy level identifier to the existing project hierarchy;

in response to the new hierarchy level being added above a particular level of the existing project hierarchy, assigning the particular level as a child to the new hierarchy level;

in response to the new hierarchy level being added below the particular level of the existing project hierarchy, assigning the particular level as a parent to the new hierarchy level;

receiving a second request to associate a particular issue type with the new hierarchy level, the particular issue type corresponding to a particular issue value stored in the issue type field;

in response to receiving a second request to associate a particular issue type with the new hierarchy level, associating the particular issue type with the new hierarchy level by storing a new association data record in the data store of the issue tracking system; and in accordance with a particular issue item of the plurality of issue items corresponding to the particular issue value in the issue type field, assigning the particular issue item to the new hierarchy level.

2. The computer-implemented method of claim 1, further comprising prior to adding the new hierarchy level identifier, validating whether the first request to add the new hierarchy level is permissible based on one or more of: a permission granted to a user; or a value of the new hierarchy level.

3. The computer-implemented method of claim 1, wherein the first request describes the particular level of the existing project hierarchy using at least one of a respective hierarchy level identifier or a hierarchy level name.

4. The computer-implemented method of claim 1, further comprising prior to associating the particular issue type with the new hierarchy level, validating whether the second request is received from a user of the client instance of an issue tracking system application having a permission to associate the particular issue type with the new hierarchy level.

5. The computer-implemented method of claim 1, further comprising prior to associating the particular issue type with the new hierarchy level, determining whether an association of the particular issue type and the new hierarchy level is allowed.

6. The computer-implemented method of claim 1, wherein:

assigning the particular level as the child to the new hierarchy level comprises updating a parent hierarchy level ID of the particular level to the new hierarchy level identifier; and assigning the particular level as the parent to the new hierarchy level comprises updating a child hierarchy level ID of the particular level to the new hierarchy level identifier.

7. The computer-implemented method of claim 1, wherein the new hierarchy level identifier is added to generate the modified project hierarchy when the new hierarchy level is within a valid range of hierarchy level values.

\* \* \* \* \*